Aug. 3, 1954

C. C. PECK 2,685,629

TUBE WELDING MECHANISM

Filed Feb. 15, 1949

INVENTOR.
CECIL C. PECK
BY
Oberlin & Limbach
ATTORNEYS.

Aug. 3, 1954 C. C. PECK 2,685,629
TUBE WELDING MECHANISM
Filed Feb. 15, 1949 4 Sheets-Sheet 2
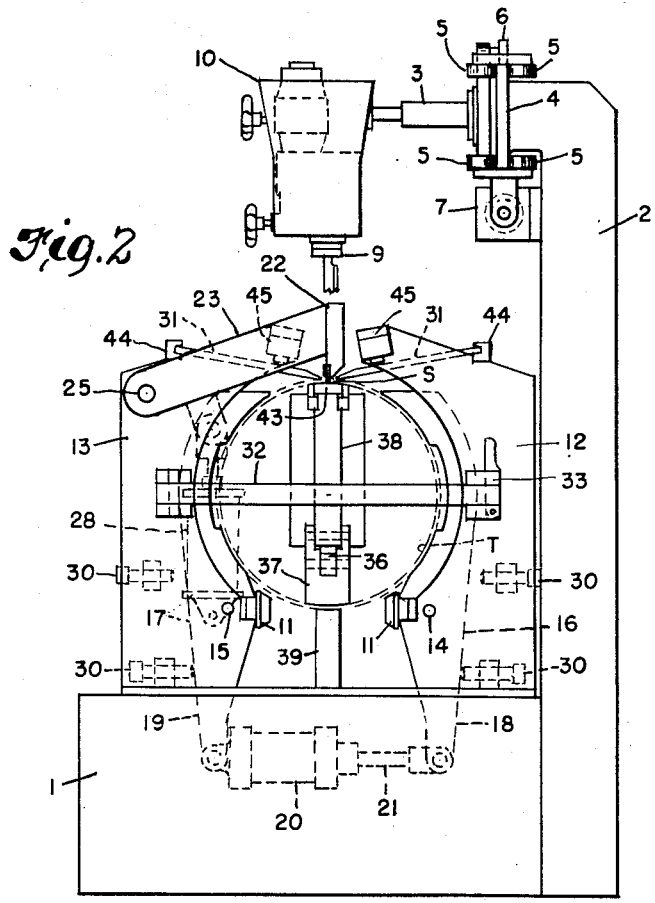
Fig. 2
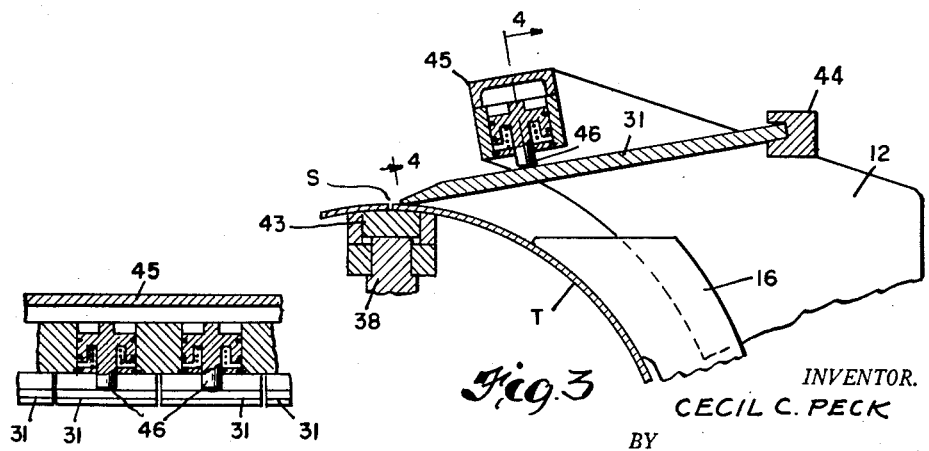
Fig. 3
Fig. 4
INVENTOR.
CECIL C. PECK
BY
Oberlin & Limbach
ATTORNEYS.

Aug. 3, 1954    C. C. PECK    2,685,629
TUBE WELDING MECHANISM
Filed Feb. 15, 1949    4 Sheets-Sheet 3

INVENTOR.
CECIL C. PECK
BY
Oberlin & Limbach
ATTORNEYS.

Aug. 3, 1954 C. C. PECK 2,685,629
TUBE WELDING MECHANISM
Filed Feb. 15, 1949 4 Sheets-Sheet 4

INVENTOR.
CECIL C. PECK
BY
Oberlin & Limbach
ATTORNEYS.

Patented Aug. 3, 1954

2,685,629

UNITED STATES PATENT OFFICE 2,685,629

TUBE WELDING MECHANISM

Cecil C. Peck, Euclid, Ohio

Application February 15, 1949, Serial No. 76,561

8 Claims. (Cl. 219—8)

This invention relates as indicated to tube welding mechanism, and more particularly to apparatus adapted to weld a longitudinal seam in a cylindrical tank or like tubular member.

One method of forming tubes and especially cylindrical members for tanks and the like has been to shape a metal sheet into cylindrical form and then to weld the abutting edges thereof. In order to support the tubular member during the welding operation various types of mandrels and anvils have been inserted within the same. Considerable difficulty has, however, been encountered in properly forming and positioning the tubular member for welding and also in avoiding distortion of such member as a result of the welding operation.

It is accordingly a primary object of my invention to provide means adapted properly to support a tubular member having a longitudinal seam which is to be welded.

Another object of my invention is to provide internal supporting means for such tubular member which will be more rigid than those previously employed and which may also include a back-up bar or the like for the seam to be welded.

Still another object is to provide means effective properly to align such seam preliminarily to the welding operation and means effective to maintain such alignment during the welding operation.

A further object is to provide apparatus of the type indicated which will be substantially automatic in operation.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 2 is an end elevational view of such apparatus;

Fig. 3 is a fragmentary sectional view showing a portion of the tube clamping means;

Fig. 4 is a sectional view taken along the line 4—4 on Fig. 3;

Figure 1:
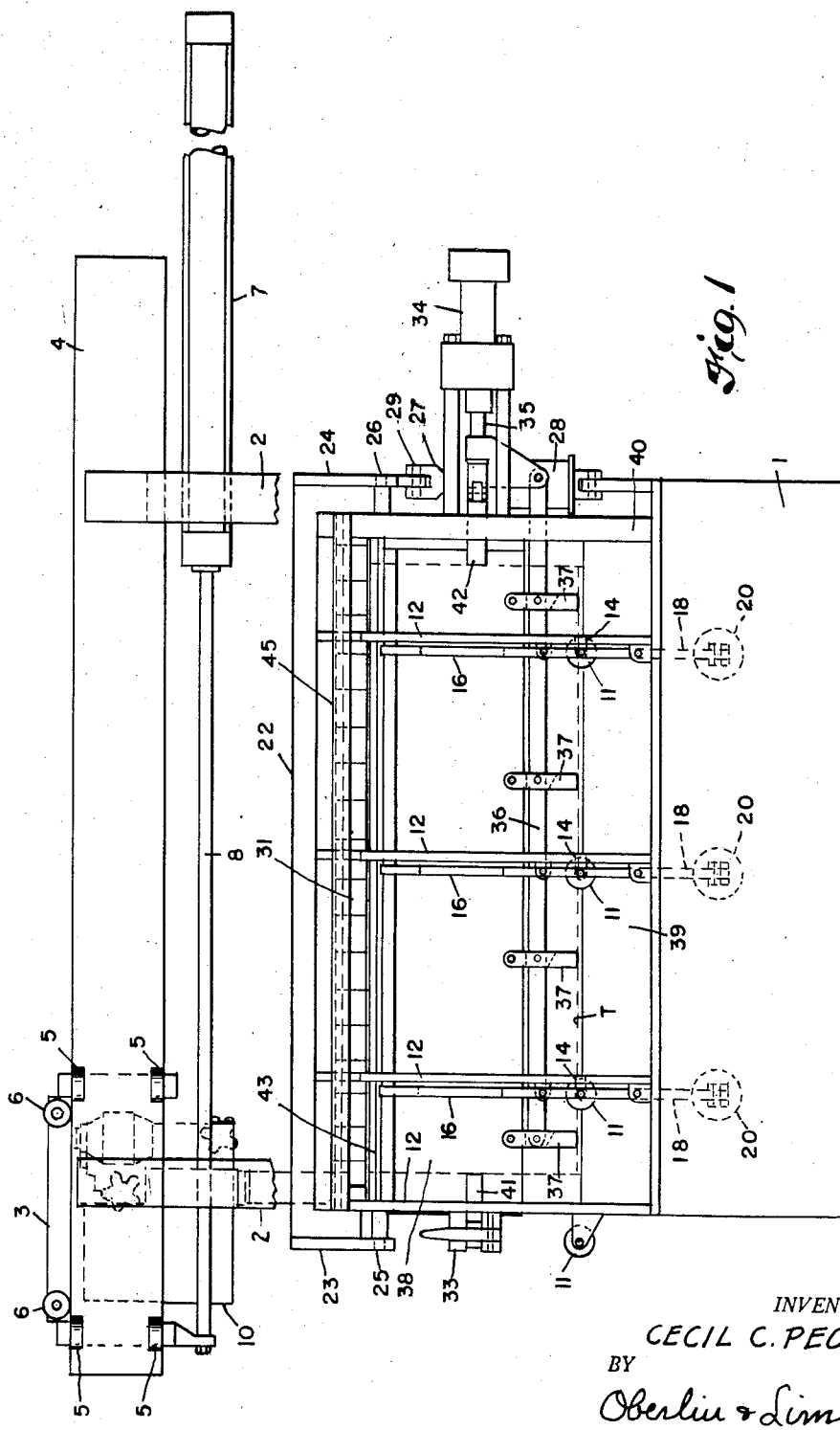
Fig. 1 is a side elevational view of the apparatus of my invention.

Referring now more specifically to said drawing and especially Figs. 1–4 thereof, the embodiment of my invention there illustrated comprises a base frame 1 and an upwardly extending side frame or support 2. A carriage 3 is adapted to be reciprocated back and forth along rail 4, engaging the sides of the latter with rollers 5 and the top thereof with rollers 6. Such reciprocation may be effected by means of a piston-cylinder assembly 7 carried by support 2 and having a piston rod 8 secured to such carriage.

Mounted on carriage 3 for reciprocation therewith is an automatic arc welding head 9 of well-known design by which an arc welding electrode may be continuously fed downwardly to make the weld. A hopper 10 may be included to deliver a granular flux to the seam in advance of such electrode, all as is well known in the art.

The construction of the work clamping and supporting means adapted to be operated in conjunction with the above-described welding means may best be understood in conjunction with an explanation of the operation thereof.

The tube or tank T will have been previously formed into cylindrical shape with the two opposed edges forming the longitudinal seam S which is to be welded. This tube or cylinder is slid endwise into the mechanism of my invention, resting preliminarily on bevelled rollers 11. Such cylinder is in effect cradled between two series of opposed arcuate supports 12 and 13 on which rollers 11 are mounted. Pivotally secured to such supports at 14 and 15 are opposed arcuate clamping members 16 and 17 having lower tail members 18 and 19 interconnected by piston-cylinder assemblies 20. It will thus be apparent that when the piston 21 of such latter assembly is retracted within the cylinder clamping members 16 and 17 will open laterally outwardly above their respective pivots 14 and 15, and when piston 21 is extended such clamping members will be forced toward one another to tightly clamp the sides of the tubular member T.

A straight edge guide bar 22 is carried by arms 23 and 24 pivotally mounted at 25 and 26 respectively so that, when in lowered position as shown in Fig. 1, the edge of such guide bar may enter the seam S and properly align the seam for welding when the tubular member is inserted into the mechanism. Piston 27 extending from fluid pressure cylinder 28 is pivotally connected to arm 24 at 29 and upon being extended from such cylinder is effective to rock guide bar 22 back out of the way of the welding operation.

Adjustable stops 30 serve to limit rocking action of arcuate clamping members 16 and 17 in either direction. When the tank or tube is being inserted endwise into the mechanism as above described, such side clamps will, of course, be opened out and also upper fingers 31 will be elevated. The function of such fingers will be explained below.

When the tube T has been fully inserted, hinged end gate 32 is then closed and locked by means of latch 33, thereby closing a limit switch (not shown). Closing of such switch is effective to cause energization of fluid-pressure cylinder 34, extending piston 35. Extension of such piston operates to move control rod 36 from right to left as viewed in Fig. 1, erecting legs or dogs 37 pivotally secured to main internal support bar 38. The underside of tube T is adapted to rest on lower support bar 39. Bar 38 is carried by end frame member 40.

Tube T is positioned longitudinally within the mechanism by two pair of stops or fingers 41 and 42, the former being mounted on gate 32 and the latter on piston 35 of cylinder 34. Reciprocation of such piston consequently causes the tube to be properly positioned by action of such latter fingers, as well as simultaneously erecting legs or dogs 37. The tube is now ready to be clamped. Legs 37 have a toggle action when thus erected, affording rigid support.

Upon completion of outward movement of piston 35 cylinders 20 are energized to extend pistons 21, thereby causing side clamps 16 and 17 to bear against tube T, forcing the walls of the same inwardly to the extent permitted by stops 30.

Upon completion of such side clamping operation fluid pressure is admitted to the finger clamps to cause the opposed edges of the tube T at seam S to be firmly held against back-up strip 43 carried on the upper side of bar 38. Such finger clamps comprise a plurality of individual fingers 31 arranged in two opposed rows or banks and pivotally mounted at 44 for movement in vertical planes. Each bank of fingers is backed by a fluid pressure conduit 45 carried by the supports 12 and 13 respectively and fitted with spring-backed plungers 46 (see Figs. 3 and 4) individually bearing against such fingers. Thus, when fluid pressure is admitted to conduits 45 such plungers are advanced and force the fingers to bear down on tube T adjacent seam S.

Upon operation of such fingers fluid pressure is admitted to cylinder 28 to rock guide bar 22 up out of the way to expose seam S for welding by arc welding head 9 which now traverses the seam through operation of cylinder 7. The weld rod is advanced at the proper rate and the flux dispensed from hopper 10 in the manner well known to the art.

It will be seen from the foregoing that I provide means which first properly position the tube or cylinder longitudinally and grip the same along a line diametrically opposite the seam to be welded; then form such cylinder to final shape for welding; and then hold such cylinder against distortion during the welding operation.

When the welding head has completed its traverse, it automatically stops and feeding of the electrode is likewise stopped. The operator now opens gate 32 (breaking the automatic control circuit) and removes the welded tube. The welding head is returned to starting position and guide bar 22 drops down again to engage the seam of the next tube to be inserted for welding. The cycle is then repeated.

The fluid-pressure means employed may be either pneumatic or hydraulic, but I preferably employ an all-pneumatic system with the exception of the finger clamp operating means 45. Here I prefer to use hydraulic fluid in conduit 45 to operate plungers 46 but the fluid supply source may be actuated by pneumatic pressure from the line operating cylinders 30. Either pressure-sequence valves may be employed in well-known manner which when overbalanced will automatically provide the desired sequence of operation of the various moving parts, or limit switches controlling solenoid operated valves may be used, or combinations of the same.

An unusual feature of the apparatus of my invention is the rigidity and effectiveness of my tube clamping and supporting means. Not only is the tube clamped longitudinally between legs 37 of bar 38 and lower supporting bar 39 but also the tube adjacent seam S is similarly clamped between fingers 31 and backing strip 43, all clamping pressures being such as to ensure conformance of the tube to predetermined shape without possibility of undesired distortion due to sagging, twisting, etc. When employing standard jigs and fixtures, it is common to find that side clamping of the tube will cause the edges of the seam to rise or bulge. As a consequence, poorly welded seams have not been infrequent and the resultant tubes or tanks have not been truly cylindrical. By using a plurality of closely adjacent clamping fingers 31 I compensate for slight irregularities, yet obtain substantally even and continuous pressure along the entire length of the seam. Such pressure is moreover transmitted down through bar 38, legs 37, and bar 39 to base 1 of the machine. The tube can in no way be squeezed out of desired shape by the rather heavy clamping pressures imposed thereon.

Figure 5:
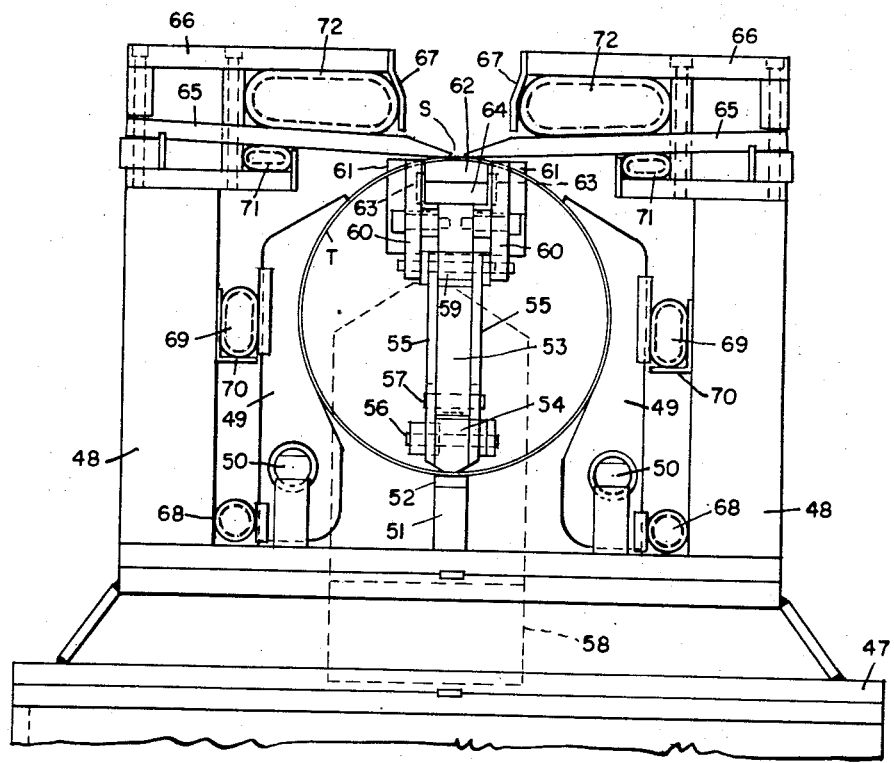
Fig. 5 is a view of the tube clamping means similar to that of Fig. 2 but showing different operating mechanism.

Referring now more particularly to Fig. 5 of the drawing, a generally analogous but less expensive embodiment of my invention is there illustrated.

A base frame 47 supports two parallel rows of standards 48 between which a series of opposed arcuate clamping members 49 are pivotally mounted at 50. A lower support bar 51 having a tool steel wear strip 52 corresponds to bar 39 of the Fig. 1 embodiment. Tube T is inserted into the mechanism from the near end as viewed in Fig. 5, over main inner support bar 53 corresponding to bar 38. Bar 53 is supported at the far end as is the case of bar 38 and therefore may be considered as a horn until the clamping means is brought into operation. A series of legs 54 are pivotally secured to bar 53 similar to legs 37 and adapted to be similarly rocked through reciprocation of two side plates 55 pivotally connected to such legs at 56, thereby clamping tube T between the ends of such legs and wear strip 52 of bar 51. Legs 54 are pivotally mounted at 57 on bar 53.

Said side plates 55 are adapted to be reciprocated in unison by means of a piston-cylinder assembly (not shown) corresponding to cylinder 34 and piston 35 of the Fig. 1 embodiment and mounted on end stand 58.

The near ends of said plates 55 as viewed in Fig. 5 extend beyond the end of bar 53, being spaced by bushing 59 and pivotally connected with the ends of a pair of gauging fingers 60 which are pivotally mounted on bar 53. It will be apparent, therefore, that when plates 55 are reciprocated toward the viewer in Fig. 5 to erect legs 54, gauging fingers 60 will likewise be erected and will engage the outer end of tube T as shown, finally straightening such tube against back stops 61 at the far end.

Back-up strip 62, which may, for example, be of copper, is clamped in a trough formed by side members 63 and bottom strip 64 carried by bar 53. Strip 62, while sufficiently firmly held is nevertheless permitted to expand when heated.

Two opposed rows of clamping fingers 65 corresponding to fingers 31 are employed and upper frame 66 carries a pair of downwardly extending flanges 67 forming a trough therebetween adapted to receive the welding flux for submerged arc welding, for example. Otherwise, the structure is generally similar to that previously described.

Instead of piston-cylinder assemblies, however, the operating means shown comprise lengths of flexible "mill hose" or "fire hose" adapted to be inflated by pneumatic pressure. These hoses or "air bags" include hoses 68 between the bases of standards 48 and side clamps 49 operative to rock the latter into open position when inflated and hoses 69 resting on brackets 70 on standards 48 operative to rock said side clamps into clamping position.

Similarly, hoses 71, when inflated, will elevate fingers 65, and when deflated and hoses 72 instead inflated will move such fingers into clamping position.

Figure 6:
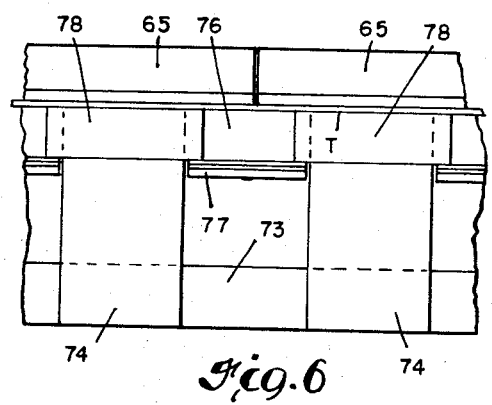
Fig. 6 is an enlarged fragmentary end view of the upper clamping fingers taken along the seam to be welded.
Figure 7:
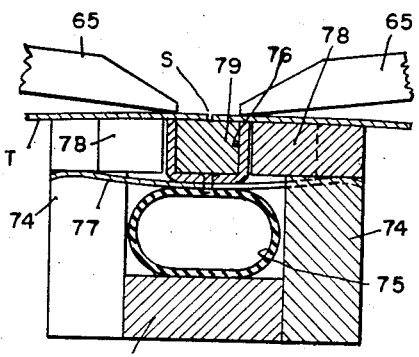
Fig. 7 is a similar enlarged view taken at right angles to Fig. 6.

In Figs. 6 and 7 there is illustrated a modified form of back-up strip adapted to be carried on the upper side of bar 53. As shown in side elevation in Fig. 6 the same may comprise a bottom strip 73 having a series of vertical uprights 74 secured to either side thereof. Fig. 7 is a section transversely of Fig. 6. Lying along the upper surface of strip 73 is an air bag or hose 75 which may be inflated when desired. A channel 76 having a plurality of transverse leaf springs 77 secured to its underside is fitted between the rows of blocks 78 forming the capitals of uprights 74, with the ends of said springs engaged beneath the protruding edges of such blocks. A back-up strip 79, which may be of copper, may be inserted in channel 76 and when hose 75 is inflated such strip will be forced up against the underside of seam S. Trough or channel 76 may also be filled with flux whereby an excellent double bead may be obtained on welding, avoiding the necessity of later welding the inside of the tube or tank.

Figure 8:
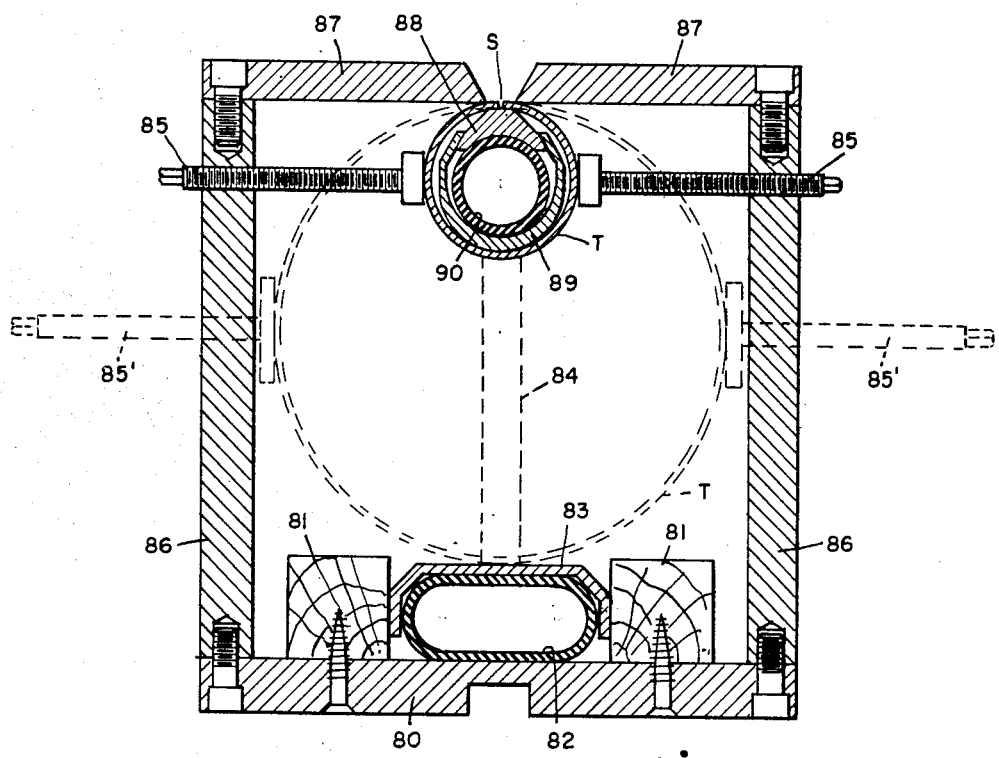
Fig. 8 is a sectional view of a modified form of tube clamping apparatus showing a different form of back-up bar.

Fig. 8 illustrates in section still another modification of even simpler construction but embodying certain primary features of my invention. Such device comprises a base 80 having secured thereto two parallel strips 81 between which an air bag or hose 82 is confined. An inverted metal trough 83 rests on such hose and is adapted to support the underside of tube T, either directly when the largest suitable size of the latter is inserted (dotted line) or by means of an interposed bar 84 of properly selected dimensions when a smaller size tube (solid line) is to be welded. The tube T shown in solid line is the smallest size the machine is capable of handling.

Side clamps such as screw members 85 or 85' are mounted in side standards 86 on the horizontal diameter of the tube to be welded and heavy upper plates 87 are secured in place adapted to engage the tube adjacent the seam and bear down thereon. The bevelled slot therebetween will receive the flux for the welding operation.

Inserted within tube T is a back-up strip 88, ordinarily of copper, fitting within a trough-shaped arbor 89. An air bag 90 within such trough may be inflated to force such strip upwardly against the underside of seam S. The arbor will be of such a size that relatively little movement of such strip 88 will be required to apply heavy clamping pressure on the seam, in cooperation with plates 87.

In operation, the side clamps 85 are adjusted against the cylinder or tube T to proper diameter of the latter and upper clamping plates 87 are brought down. Air under pressure is now admitted to both air bags 82 and 90, bringing tube T to proper vertical diameter and clamping the edges of seam S between back-up strip 88 and the edges of plates 87.

Figure 9:
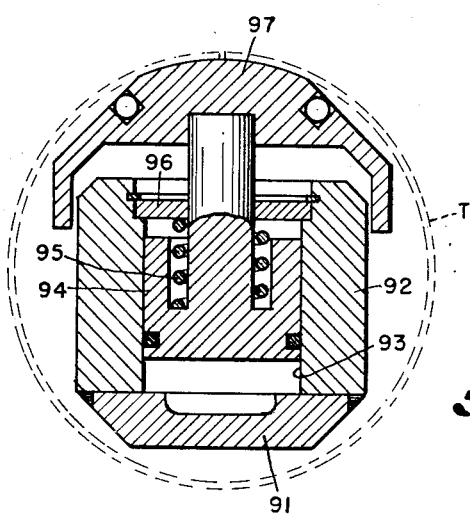
Fig. 9 is an enlarged view in cross-section of still another form of combined back-up bar and inner brace or support.

Fig. 9 shows in cross-section a modified form of mandrel and back-up strip comprising a shallow channel member 91 welded to a bar 92 having a plurality of cylindrical openings 93 therethrough communicating with such channel. In each such cylinder there is fitted a piston such as 94 normally retracted therein through action of spring 95 bearing against retainer 96. Such pistons bear against the underside of back-up strip 97 and when fluid pressure is admitted to channel 91 the strip will be forced upwardly as viewed in Fig. 9, in effect expanding the mandrel within the tube. While the back-up strip may be of metal or refractory material, particularly when the lighter gages are to be welded, it may have a trough-shaped upper surface analogous to the Fig. 7 form adapted to receive a granular flux. With this latter arrangement one-half inch plate may be successfully welded with formation of a double bead (inside and outside the tube).

It will be seen from the foregoing that I have provided novel means for welding objects such as tubing, cylinders, and tanks which is adapted to shape such objects to desired final form and hold the same in such form during the welding operation. The combination of lateral clamping means with rigid vertical supporting means, both internal and external, permits the seam to be welded to be aligned properly for the welding operation and held against distortion during the same.

Other modes of applying the principle of the invention may be employed, change being made as regards the details described, provided the features stated in any of the following claims or the equivalent of such be employed.

I therefore particularly point out and distinctly claim as my invention:

1. In a tube welding mechanism comprising a cradle adapted to receive a cylindrical work-piece having a longitudinal seam to be welded, and an automatic electric arc-welding head mounted to traverse and weld such seam; opposed arcuate clamping members pivotally mounted laterally to engage such cylindrical work-piece therebetween, an uninterrupted retractable straight-edge mounted on said cradle for engaging in such seam, said straight-edge extending substantially the length of such seam, a support bar disposed to extend within such cylindrical work-piece and engage the same adjacent both sides of such seam, toggle means on said bar operative to press against the interior of such cylindrical work-piece along a line diametrically opposite to such seam to brace said bar against such work-piece adjacent such seam, a rigid support for such work-piece externally of the portion thereof thus engaged by said toggle means, a plurality of clamping fingers pivotally mounted in close side-by-side relationship to bear upon the outer edge portions of such seam, and individual fluid pressure piston-cylinder assemblies operative when actuated to force said clamping fingers against such work-piece.

2. In a tube welding mechanism comprising a cradle adapted to receive a cylindrical work-piece axially inserted therein and having a longitudinal seam to be welded, and an automatic electric arc-welding head mounted to traverse and weld such seam; a pivotally retractable uninterrupted straight-edge mounted on said cradle for engaging in such seam when such work-piece is thus inserted to align the same, said straight-edge extending substantially the length of such seam, a series of opposed arcuate clamping members pivotally mounted on said cradle to engage such cylindrical work-piece between their opposed arcuate surfaces to conform such work-piece thereto, fluid pressure piston-cylinders interconnecting opposed pairs of said clamping members operative to move the latter into and out of clamping position, a support bar disposed to extend within such cylindrical work-piece and engage the interior of the same adjacent both sides of such seam, toggle means on said bar operative to press against the interior of such cylindrical work-piece along a line diametrically opposite to such seam to brace said bar against such work-piece adjacent such seam, a rigid support for such work-piece externally thereof along the line engaged by said toggle means, two rows of clamping fingers pivotally mounted in close side-by-side relationship to bear upon the respective outer edge portions of such seam, and individual fluid pressure piston-cylinder assemblies operative when actuated to force said fingers against such work-piece.

3. In tube welding mechanism, means for supporting a cylindrical work-piece having a longitudinal seam to be welded, opposed clamping members mounted to engage the sides of such work-piece therebetween to force the edges of such seam toward each other, said clamping members being movable away from each other to accommodate axial feed of such work-piece to welding position therebetween, an uninterrupted retractable straight-edge for engaging in such seam to ensure proper alignment thereof as the work-piece is fed to the mechanism, said straight-edge extending substantially the length of such seam, expanding means disposed to extend within such cylindrical work-piece and operative when expanded to bear against the inner side of such work-piece along such seam and against an inner portion opposite thereto, a rigid support for such work-piece externally of such latter portion, external clamping means operative to bear on such work-piece along both sides of such seam to clamp the opposed edge portions of such seam between said clamping means and said expanding means, and means for withdrawing said straight-edge from such seam subsequent to clamping of the work-piece by said expanding means and opposed clamping members, the straight-edge thereby maintaining the seam in proper alignment until the work-piece is firmly clamped.

4. In tube welding mechanism, work-piece supporting means constructed and arranged to receive a cylindrical work-piece having a longitudinal seam to be welded, opposed clamping means mounted to engage portions only of the sides of such work-piece laterally of such seam, means for adjustably limiting movement of said clamping members toward one another, an expansible inner support for such work-piece operative to engage only such seam edge portions and the portion of such work-piece diametrically opposite thereto, the sides of said inner support being respectively spaced from the sides of the work-piece, whereby the adjusted limited movement of said clamping members toward one another determines the diametrical dimension of the work-piece therebetween and expansion of said inner support determines the diametrical work-piece dimension substantially at right angles to the first-mentioned dimension, rigid support means disposed to engage the external wall of such work-piece in the region of the latter opposite such seam for holding the wall cooperably with said inner support, and clamping fingers operative to clamp the seam edge portions against said inner support.

5. Means for supporting a cylindrical work-piece having a longitudinal seam to be welded comprising two sets of external clamping means disposed to engage such work-piece therebetween, one said set being disposed to engage such work-piece along the edge portions thereof at such seam and in a restricted region diametrically opposite the seam the other set being disposed to engage portions only of the sides of such work-piece along a diameter substantially at right angles to the diameter along which said one set engages the work-piece, and an expansible mandrel disposed to enter and support such work-piece internally against the clamping pressure of said first set of clamping means, said mandrel including spaced parallel upstanding portions disposed to underlie such work-piece internally along opposite sides of such seam and support the same against external clamping pressure thereon, an independently actuated backing strip between such portions underlying and extending continuously the length of such seam, and means operative adjustably to apply substantially uniform pressure to said strip along the length thereof so as to urge the strip into positive contact with the seam over the extent of the latter.

6. A seam welding jig adaped to support a cylindrical work-piece having a longitudinal seam to be welded comprising a mandrel operative to enter within such work-piece and engage the latter in a region opposite to such seam, spaced longitudinally extending portions carried by said mandrel disposed to engage the respective inner surfaces of such work-piece to each side of and closely adjacent such seam, expanding means operative to urge said longitudinally extending portions against such inner surfaces and said mandrel against such opposite region of such work-piece, external clamping means opposed to said spaced longitudinally extending portions operative to engage the outer surface of such work-piece adjacent each side of such seam, an elongated backing strip supported by said mandrel between said spaced longitudinally extending portions for movement toward and away from such seam independently of actuation of said expanding means, said strip extending continuously substantially the entire length of said mandrel, and means for applying substantially uniform pressure to said strip along the length thereof urging the same toward such seam so as to cause the strip to conform to the underside of the seam.

7. In a tube welding mechanism adapted to receive a cylindrical work-piece having a longitudinal seam to be welded, an inner support disposed to extend within such work-piece, spaced longitudinally extending portions carried by said support disposed to engage the respective inner surfaces of such work-piece to each side of and closely adjacent such seam, spaced parallel clamping means disposed to overlie such work-piece to each side of such seam respectively in opposition to said spaced longitudinally extending portions of the inner support, whereby the edge portions of the work-piece at the seam may be firmly clamped and a welding member caused to move therealong between said spaced parallel clamping means, an elongated seam backing member disposed directly beneath such seam between said spaced longitudinally extending portions and extending substantially the entire length of said portions, and means operative to apply substantially uniform pressure along the length of said backing member to thrust the same toward such seam independently of the pressure of said inner support against the work.

8. In a tube welding mechanism adapted to receive a cylindrical work-piece having a longitudinal seam to be welded, an inner support disposed to extend within such work-piece, spaced longitudinally extending portions carried by said support disposed to underlie such work-piece to each side of such seam respectively, two rows of clamping fingers pivotally mounted in close side-by-side relationship to overlie the work to each side of such seam respectively in opposition to said supporting means, means operative to rock such fingers into and out of clamping position, said means comprising a pair of inflatable hoses for each such row of fingers disposed to engage the upper and lower surfaces thereof respectively, such hoses extending the length of such rows uniformly transversely of such fingers, a continuous backing strip disposed directly beneath such seam between said spaced longitudinally extending portions and extending substantially the entire length of said portions, and an elongated inflatable bag supported by said inner support beneath the length of said strip operative when inflated to shift said strip bodily toward such seam independently of the pressure of said support against the work-piece.

References Cited in the file of this patent

UNITED STATES PATENTS

| Number | Name | Date |
|---|---|---|
| 747,842 | Baehr | Dec. 22, 1903 |
| 1,118,327 | Buckman | Nov. 24, 1914 |
| 1,351,445 | Smith | Aug. 31, 1920 |
| 1,371,833 | Youtsey | Mar. 15, 1921 |
| 1,534,422 | Smith et al. | Apr. 21, 1925 |
| 1,573,360 | Shoenberger | Feb. 16, 1926 |
| 1,661,970 | Sessions | Mar. 6, 1928 |
| 1,710,258 | Hume | Apr. 23, 1929 |
| 1,840,737 | Peck | Jan. 12, 1932 |
| 1,851,563 | Chapman | Mar. 29, 1932 |
| 1,922,249 | Koch | Aug. 15, 1933 |
| 1,987,664 | Brown | Jan. 15, 1935 |
| 2,176,664 | Burke | Oct. 17, 1939 |
| 2,205,002 | Tripp | June 18, 1940 |
| 2,219,742 | Haversack | Oct. 29, 1940 |
| 2,256,879 | Cornell | Sept. 23, 1941 |
| 2,371,376 | Bisbee | Mar. 13, 1945 |